(12) United States Patent
Shinkawa

(10) Patent No.: US 8,154,774 B2
(45) Date of Patent: Apr. 10, 2012

(54) OPTICAL UNIT, IMAGE READING DEVICE, AND IMAGE FORMING APPARATUS

(75) Inventor: Shohei Shinkawa, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 600 days.

(21) Appl. No.: 12/318,307

(22) Filed: Dec. 24, 2008

(65) Prior Publication Data
US 2009/0185239 A1 Jul. 23, 2009

(30) Foreign Application Priority Data
Dec. 25, 2007 (JP) ................... 2007-331995

(51) Int. Cl.
- H04N 1/04 (2006.01)
- H01S 3/13 (2006.01)
- H01S 3/08 (2006.01)
- G11B 7/00 (2006.01)
- G02B 6/30 (2006.01)

(52) U.S. Cl. .............. 358/474; 372/107; 372/29.014; 369/112.23; 385/49

(58) Field of Classification Search .......... 358/474; 372/29.014, 107; 369/112.23; 385/49
See application file for complete search history.

(56) References Cited

U.S. PATENT DOCUMENTS

| | | | | |
|---|---|---|---|---|
| 6,256,437 B1 * | 7/2001 | Sakushima et al. | | 385/49 |
| 6,687,283 B2 * | 2/2004 | Naoe | | 372/107 |
| 2007/0103737 A1 * | 5/2007 | Nakajima | | 358/474 |
| 2009/0010139 A1 * | 1/2009 | Kojima | | 369/112.23 |

FOREIGN PATENT DOCUMENTS

| | | |
|---|---|---|
| JP | 2003-092393 | 3/2003 |
| JP | 2007-151108 | 6/2007 |

* cited by examiner

*Primary Examiner* — Charlotte M Baker
*Assistant Examiner* — Rury Grisham
(74) *Attorney, Agent, or Firm* — Harness, Dickey & Pierce, P.L.C.

(57) ABSTRACT

An optical unit including a lens unit including a lens and an optical element configured to receive a light beam focused by the lens, and a support member configured to support the lens unit. Cutouts are provided on joint surfaces of the lens unit and the support member, respectively, such that the cutouts on the joint surface of the lens unit match the cutouts on the joint surface of the support member. The cutouts are configured to accommodate a jig inserted thereinto and rotated to move the lens unit relative to the support member and adjust a position of the lens unit in a direction parallel to an optical axis of the lens.

19 Claims, 14 Drawing Sheets

FIG. 1

RELATED ART

OPTICAL UNIT, IMAGE READING DEVICE, AND IMAGE FORMING APPARATUS

PRIORITY STATEMENT

The present patent application claims priority from Japanese Patent Application No. 2007-331995, filed on Dec. 25, 2007 in the Japan Patent Office, the entire contents of which are hereby incorporated herein by reference.

BACKGROUND

1. Technical Field

Illustrative embodiments generally relate to an optical unit including optical elements such as a lens and a photoelectric converter element configured to receive a light beam focused by the lens in which positions of the optical elements can be adjusted, an image reading device including the optical unit, and an image forming apparatus including the image reading device.

2. Description of the Related Art

In related-art image reading devices, for example, light is directed onto an original document (hereinafter "document") and a photoelectric converter element comprised of a CCD, a CMOS, or the like receives the light reflected from the document and converts that light into electrical signals, so that the document is read as photoelectrically converted image data. The basic configuration of one example of such related-art image reading devices is shown in FIG. 1.

Figure 1:
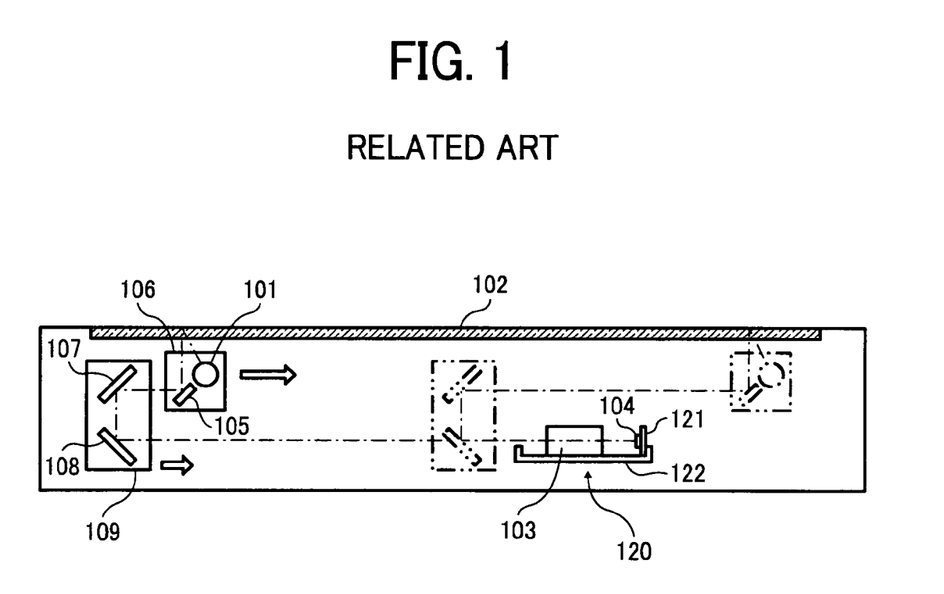
FIG. 1 is a schematic diagram illustrating a related-art image reading device.

As illustrated in FIG. 1, such an image reading device has as a light source a xenon lamp 101 having a generally cylindrical shape extending in a main scanning direction. The xenon lamp 101 directs light onto a document placed on a contact glass 102, and the light reflected from the document is directed to a photoelectric converter element 104 via a lens 103. As described above, the photoelectric converter element 104 converts the light into electrical signals.

The above-described image reading device further includes a first carriage 106 including the xenon lamp 101 and a first mirror 105 configured to deflect the light reflected from the document, and a second carriage 109 including a second mirror 107 configured to further deflect the light deflected by the first mirror 105 and a third mirror 108. Each of the first carriage 106 and the second carriage 109 runs below the contact glass 102 at a predetermined scanning speed to read the document placed on the contact glass 102.

The lens 103 and the photoelectric converter element 104 are both mounted in an image reading unit 120, and therefore whenever the light striking a light-receiving surface of the photoelectric converter element 104 deviates from the optical axis of the lens 103 and the photoelectric converter element 104, an image of the document is not properly read. To ensure that the quality of the read image satisfies design standards, the relative positions of the document and the lens 103, and the lens 103 and the photoelectric converter element 104 are adjusted as appropriate, after which the lens 103, the photoelectric converter element 104, and a photoelectric converter element control circuit 121 are fixed in place in a support member 122.

Although there are many methods by which this adjustment can be carried out, the lens 103 and the photoelectric converter element 104 may, for example, be fixed in place with an ultraviolet adhesive after adjusting the relative positions thereof using a jig. However, such an arrangement increases the size of the jig and thus the cost of the device.

To solve such problems, one recent approach involves an image reading device having cutouts provided in a lens unit. Use of such cutouts enables optical adjustment of the lens unit to be carried out using a smaller jig such as a slotted screwdriver.

However, because lens conjugate distances vary greatly over a wide range, when the lens and the photoelectric converter element are moved together as a single unit along the optical axis to adjust magnification, a larger jig such as a movable stage is required to cope with such adjustment over a wide range.

SUMMARY

In view of the foregoing, illustrative embodiments provide an optical unit having cutouts capable of adjusting a magnification over a wider range, an image reading device including the optical unit, and an image forming apparatus including the image reading device.

At least one embodiment provides an optical unit including a lens unit including a lens and an optical element configured to receive a light beam focused by the lens, and a support member configured to support the lens unit. Cutouts are provided on joint surfaces of the lens unit and the support member, respectively, such that the cutouts on the joint surface of the lens unit match the cutouts on the joint surface of the support member. The cutouts are configured to accommodate a jig inserted thereinto and rotated to move the lens unit relative to the support member and adjust a position of the lens unit in a direction parallel to an optical axis of the lens.

At least one embodiment provides an image reading device configured to read an image by directing a light beam onto the image, receiving the light beam reflected from the image using an optical element, and converting the reflected light into electrical signals for output as image data. The image reading device includes the optical unit described above.

At least one embodiment provides an image forming apparatus including the image reading device described above, and an image forming device configured to form an image on a recording medium based on an image read by the image reading device and photoelectrically converted into image data.

Additional features and advantages of the illustrative embodiments will be more fully apparent from the following detailed description, the accompanying drawings, and the associated claims.

BRIEF DESCRIPTION OF THE DRAWINGS

A more complete appreciation of illustrative embodiments and the many attendant advantages thereof will be readily obtained as the same becomes better understood by reference to the following detailed description when considered in connection with the accompanying drawings, wherein.

The accompanying drawings are intended to depict illustrative embodiments and should not be interpreted to limit the scope thereof. The accompanying drawings are not to be considered as drawn to scale unless explicitly noted.

DETAILED DESCRIPTION OF ILLUSTRATIVE EMBODIMENTS

In describing illustrative embodiments illustrated in the drawings, specific terminology is employed for the sake of clarity. However, the disclosure of this specification is not intended to be limited to the specific terminology so selected, and it is to be understood that each specific element includes all technical equivalents that operate in a similar manner and achieve a similar result.

Reference is now made to the drawings, wherein like reference numerals designate identical or corresponding parts throughout the several views.

To facilitate an understanding of the present disclosure, a description is first given of the structure and operation of an image forming apparatus according to illustrative embodiments hereof.

Figure 2:
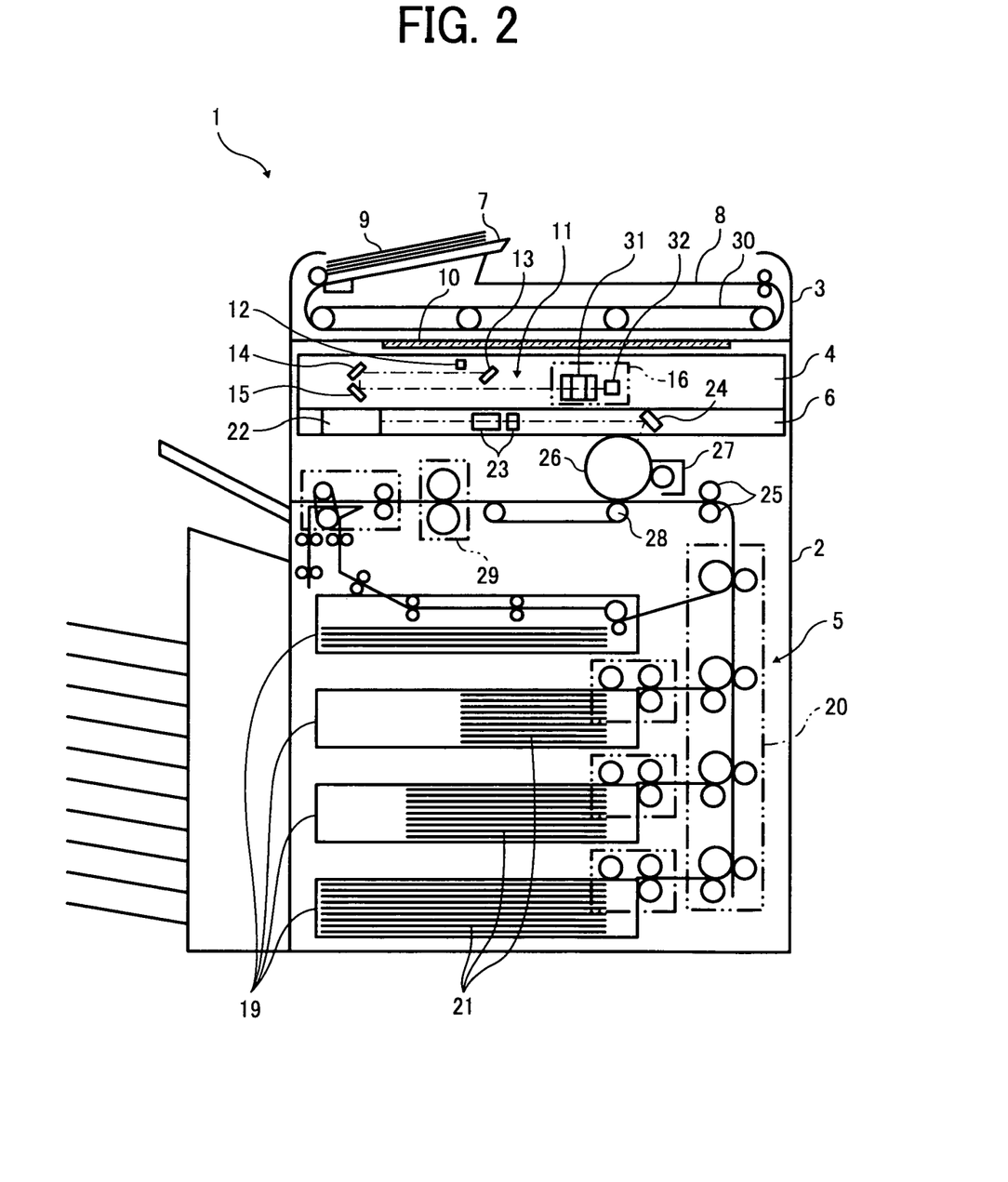
FIG. 2 is a schematic diagram illustrating an image forming apparatus according to illustrative embodiments.

FIG. 2 is a schematic diagram illustrating an image forming apparatus according to illustrative embodiments.

Referring to FIG. 2, an image forming apparatus 1 such as a copier and a facsimile machine includes, as main components thereof, a main body 2, an automatic document feeder (ADF) 3, a scanner 4 serving as an image reading device, a paper feed unit 5, and a writing unit 6. The scanner 4, the paper feed unit 5, and the writing unit 6 are included in the main body 2.

The ADF 3 is disposed above the main body 2, and includes a document conveyance device 8 including a document stand 7 and a conveyance belt 30. The document stand 7 is disposed above the main body 2 and a document 9 is placed thereon. The document conveyance device 8 is configured to convey a multi-page document 9 placed on the document stand 7 sheet by sheet, one sheet at a time, to a contact glass 10 provided at the top of the scanner 4, and discharge the document 9 read by the scanner 4 from the ADF 3.

The scanner 4 is disposed below the ADF 3, and includes the contact glass 10 and an optical scanning system 11. The contact glass 10 is horizontally mounted on an upper surface of the main body 2. The optical scanning system 11 includes an illumination lamp 12, a first mirror 13, a second mirror 14, a third mirror 15, and an image reading unit 16 including an imaging lens 31 and an image sensor 32 serving as an optical element. The illumination lamp 12 directs light onto the document 9 on the contact glass 10, and the image sensor 32 receives the light reflected from the document 9 and photoelectrically converts the light into image data in the form of electrical signals.

Figure 3:
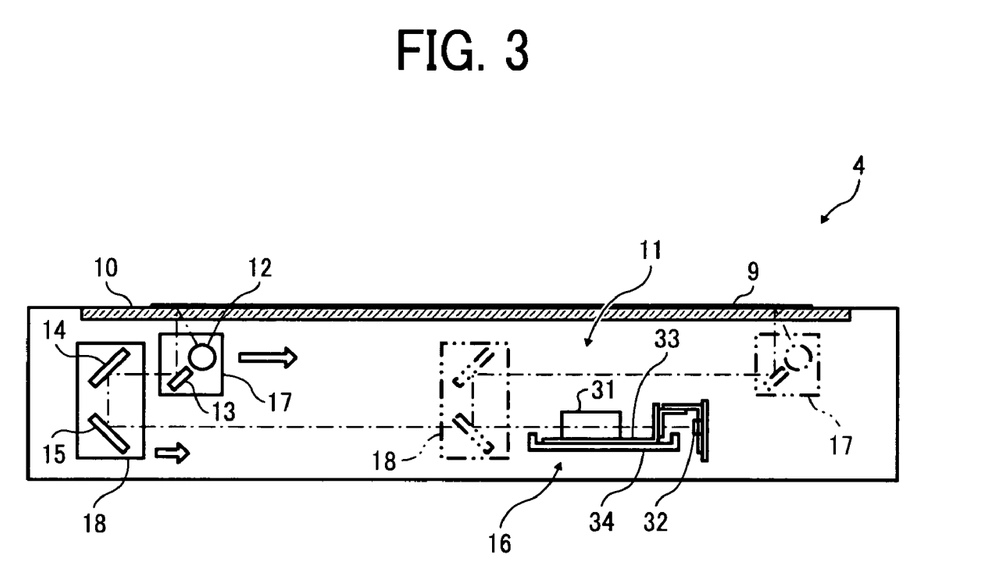
FIG. 3 is a schematic diagram illustrating a scanner according to illustrative embodiments.

FIG. 3 is a schematic diagram illustrating the scanner 4. The first mirror 13, the second mirror 14, and the third mirror 15 are configured to deflect the light reflected from the document 9 to the image reading unit 16 serving as an optical unit. The illumination lamp 12 and the first mirror 13 are provided on a first carriage 17, and the second mirror 14 and the third mirror 15 are provided on a second carriage 18. When the document 9 is read, a scanner drive unit, not shown, drives the first carriage 17 and the second carriage 18 to move the first and second carriages 17 and 18 at a speed ratio of 2 to 1 without changing optical path length.

Referring back to FIG. 2, the paper feed unit 5 is disposed at the bottom of the main body 2, and includes multiple paper cassettes 19 and a paper conveyance unit 20. Each of the multiple paper cassettes 19 stores multiple transfer sheets 21. The paper conveyance unit 20 conveys the transfer sheets 21 stored in the multiple paper cassettes 19 sheet by sheet to registration rollers 25.

The writing unit 6 includes a laser output unit 22, an imaging lens 23, a mirror 24, the registration rollers 25, a photoconductor 26, a developing device 27, a transfer device 28, and a fixing device 29.

A laser diode serving as a light source, not shown, and a polygon mirror rotated at constant high speed by a motor, not shown, are mounted in the laser output unit 22. Laser light emitted from the laser output unit 22 is deflected by the polygon mirror, and passes through the imaging lens 23. Then, the laser light is deflected by the mirror 24 and focused on a surface of the photoconductor 26 to form an image thereon. Specifically, the surface of the photoconductor 26 is scanned by the laser light in a main scanning direction perpendicular to a direction of rotation of the photoconductor 26 to record an image signal for each line. The image signal is output from an image signal processor, not shown, configured to process image data output from the image sensor 32. In the writing unit 6, the above-described scanning is repeatedly performed at a predetermined cycle corresponding to rotation speed and recording density of the photoconductor 26, so that an electrostatic latent image is formed on the surface of the photoconductor 26.

The registration rollers 25 convey the transfer sheet 21 fed from the multiple paper cassettes 19 through the paper conveyance unit 20 between the transfer device 28 and the photoconductor 26. The electrostatic latent image formed on the surface of the photoconductor 26 is developed with toner by the developing device 27 to form a visible toner image thereon, and the toner image thus formed is transferred onto the transfer sheet 21 by the transfer device 28. In the case of a multi-color image, this process is repeated for each color of toner (typically four in total), using dedicated devices and components provided for just that color toner, and the individual color images are superimposed on each other on the transfer sheet 21 to form a full-color image. After transferring the toner image onto the transfer sheet 21, the transfer device 28 conveys the transfer sheet 21 having the toner image thereon to the fixing device 29. In the fixing device 29, heat and pressure is applied to the transfer sheet 21 to fix the toner image on the transfer sheet 21. Thereafter, the transfer sheet 21 is discharged from the main body 2.

A detailed description is now given of the image reading unit 16 in the scanner 4.

Figure 4:
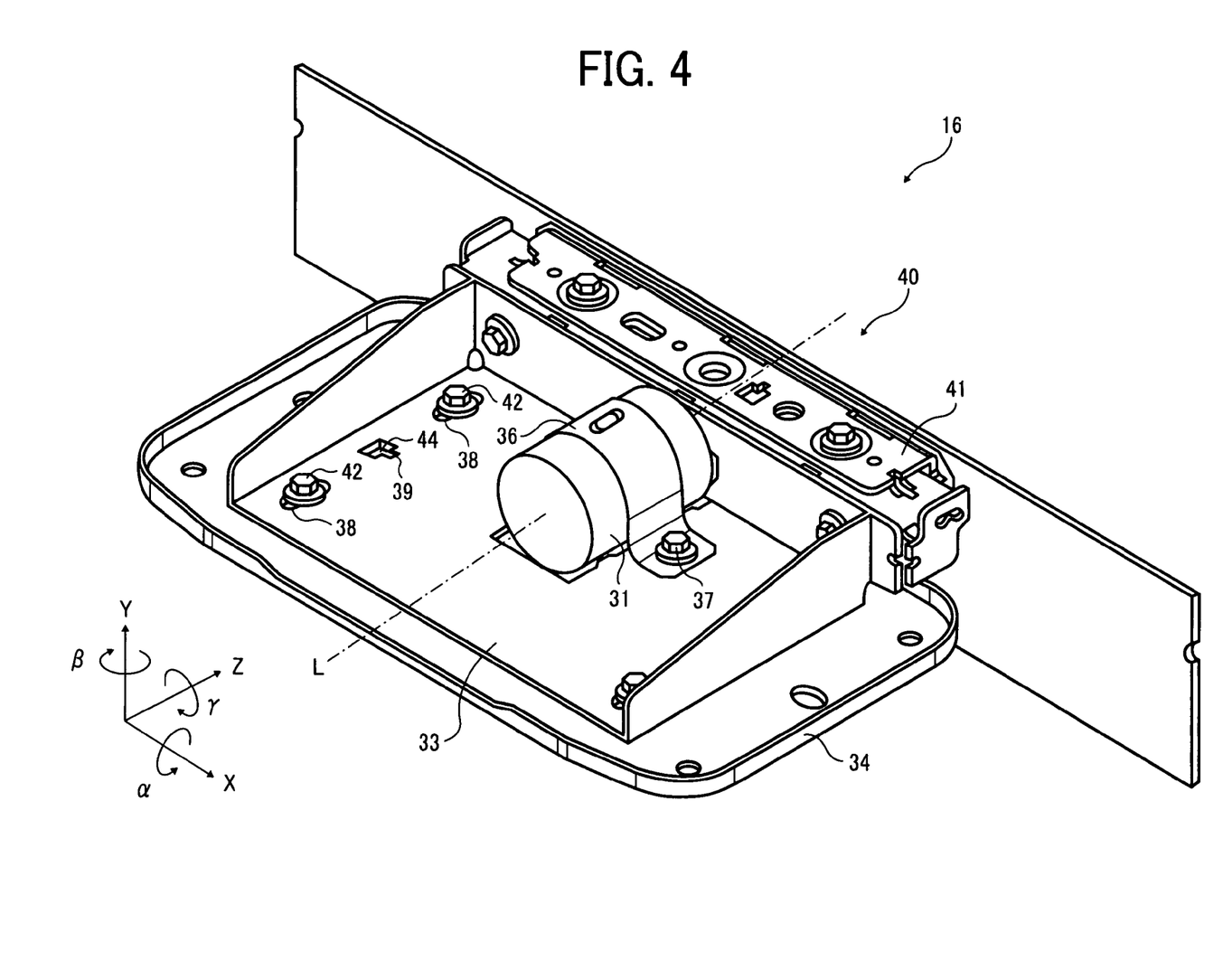
FIG. 4 is a perspective view illustrating an image reading unit according to a first illustrative embodiment.
Figure 5:
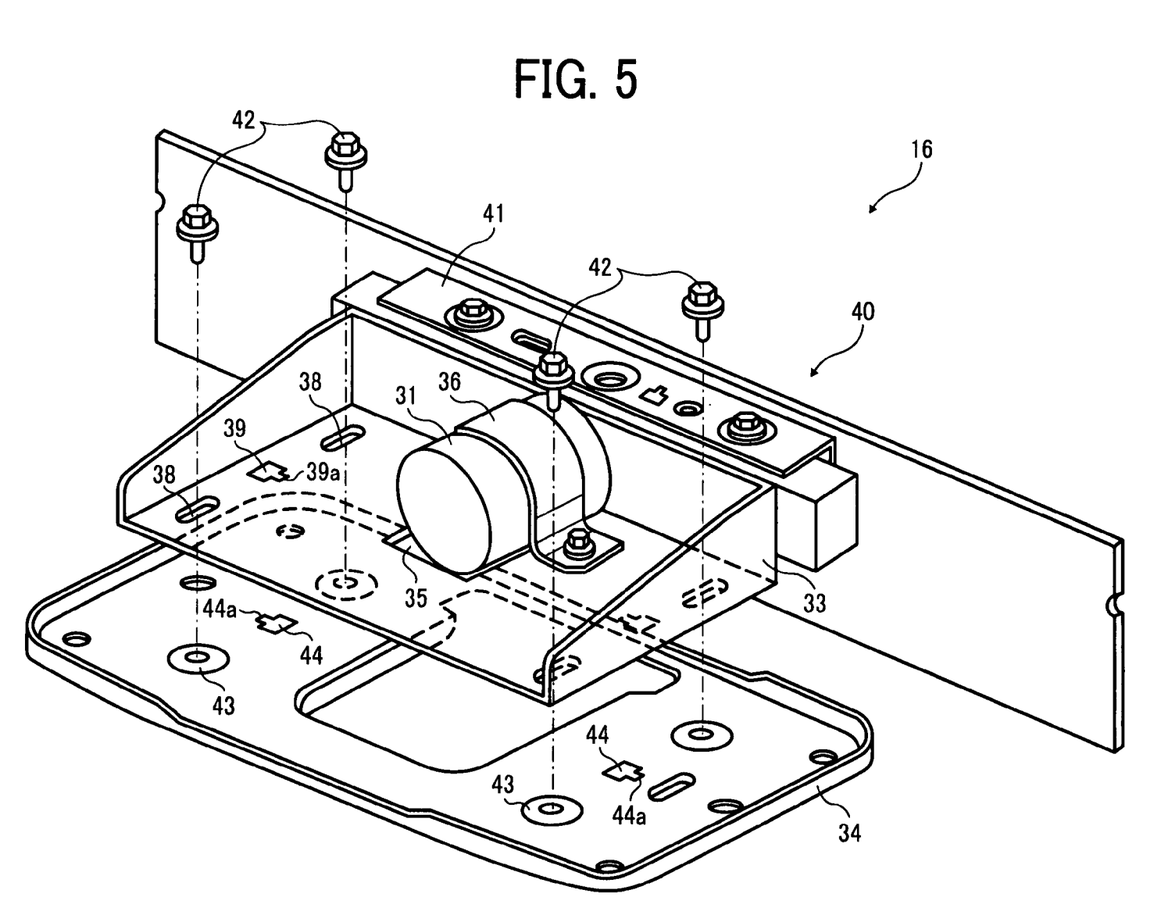
FIG. 5 is an exploded view illustrating the image reading unit illustrated in FIG. 4.
Figure 6:
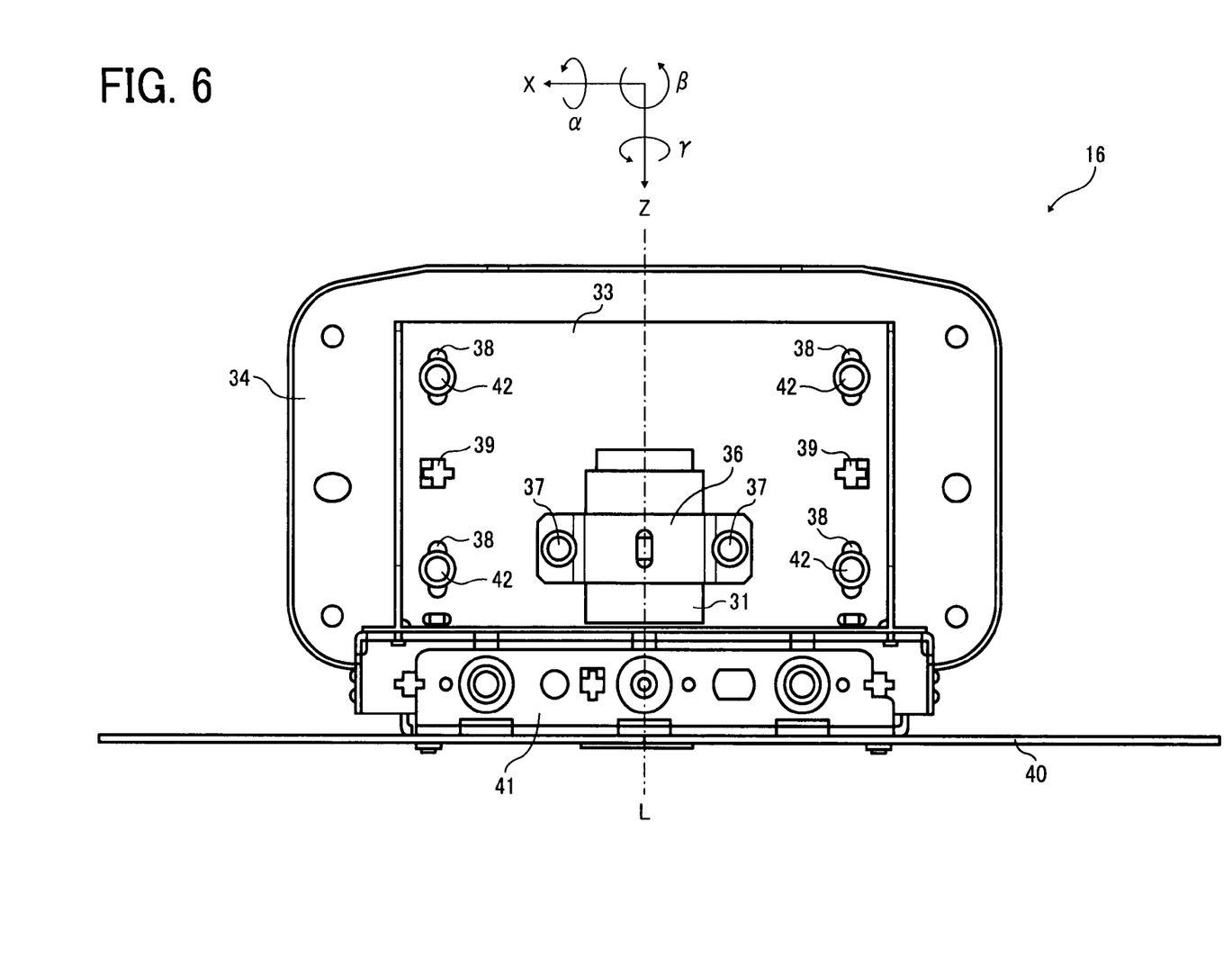
FIG. 6 is a top view illustrating the image reading unit illustrated in FIG. 4.
Figure 7:
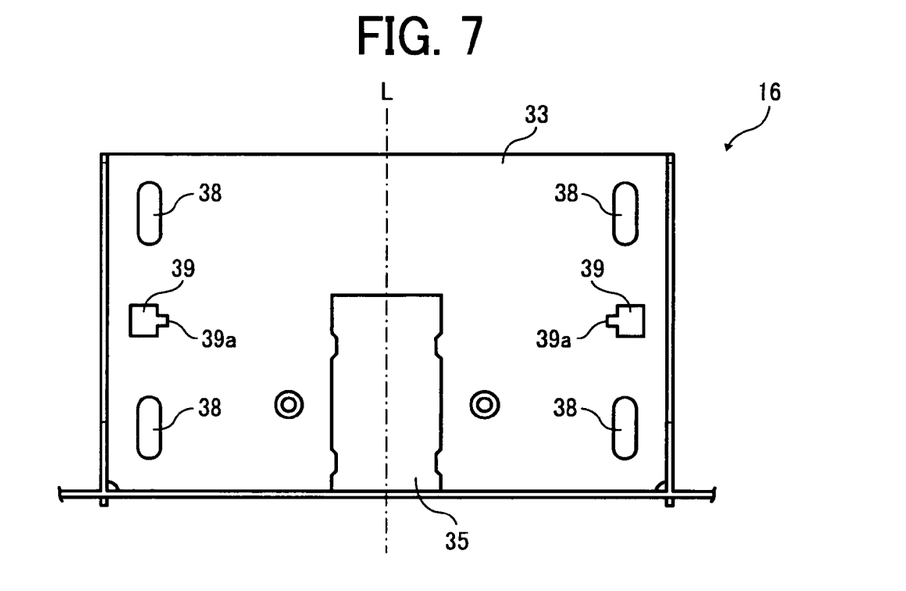
FIG. 7 is a plan view illustrating a lens support member according to the first illustrative embodiment.
Figure 8:
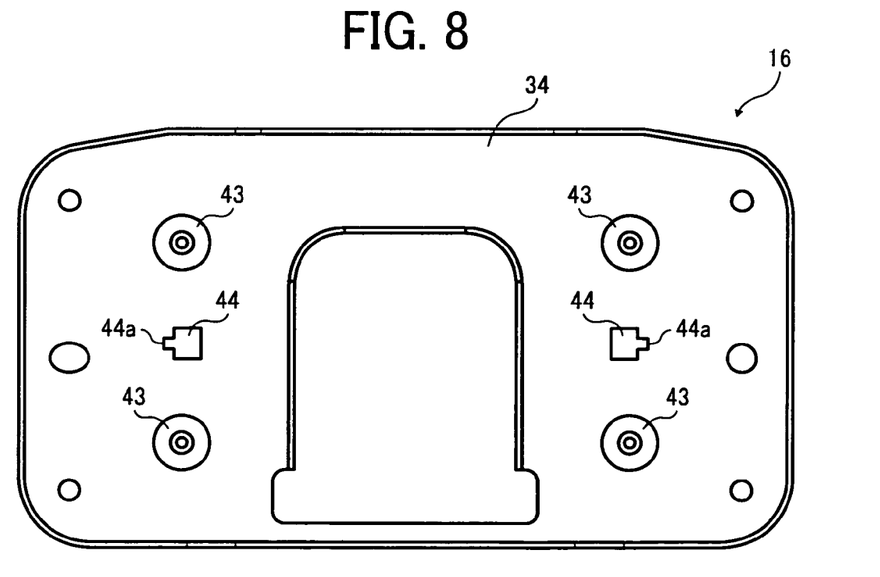
FIG. 8 is a plan view illustrating a lens unit support member according to the first illustrative embodiment.

FIG. 4 is a perspective view illustrating the image reading unit 16 in the scanner 4 according to a first illustrative embodiment. FIG. 5 is an exploded view illustrating the image reading unit 16 illustrated in FIG. 4. FIG. 6 is a top view illustrating the image reading unit 16 illustrated in FIG. 4. FIG. 7 is a plan view illustrating a lens support member according to the first illustrative embodiment. FIG. 8 is a plan view illustrating a lens unit support member according to the first illustrative embodiment.

Referring to FIGS. 4 to 8, the image reading device 16 includes a lens support member 33 serving as a lens unit configured to support the imaging lens 31 and the image sensor 32, and a lens unit support member 34 configured to support the lens support member 33.

The imaging lens 31 is mounted on a substantially rectangular cutout 35 formed in the lens support member 33 as illustrated in FIG. 7. A band-shaped attachment member 36 is placed over the imaging lens 31 to fix the imaging lens 31 to the lens support member 33 with screws 37. The lens support member 33 includes two holes 38 on each of left and right sides of an optical axis L of the imaging lens 31. Specifically, the holes 38 on the left and right sides of the lens support member 33 are aligned parallel to the optical axis L of the imaging lens 31. A cutout 39 and a contiguous smaller cutout 39a are provided between the holes 38 on each of the left and right sides of the lens support member 33, substantially in line therewith.

The lens support member 33 is attached to an image sensor unit 40 including the image sensor 32 by an adjustable mounting frame 41.

The lens unit support member 34 includes nuts 43 at positions corresponding to screws 42 inserted into the holes 38 provided on the lens supporting member 33 so that the screws 42 are engaged with the respective nuts 43. In other words, the lens support member 33 can be moved relative to the lens unit support member 34 when the screws 42 are not engaged with the nuts 43.

Each of the cutouts 39 provided in the lens support member 33 is substantially rectangular. As illustrated in FIG. 7, with each of the cutouts 39 there is the contiguous smaller cutout 39a on a side thereof, such that a part of the side of the cutout 39 is extended toward the center of the lens support member 33. The lens unit support member 34 includes substantially rectangular cutouts 44 at positions corresponding to the cutouts 39. As illustrated in FIG. 8, with each of the cutouts 44 there is a contiguous smaller cutout 44a on a side opposite to the side of the cutout 39 on which the smaller cutout 39a is provided, such that a part of the side of the cutout 44 is extended toward the outside of the lens unit support member 34.

Figure 9A:
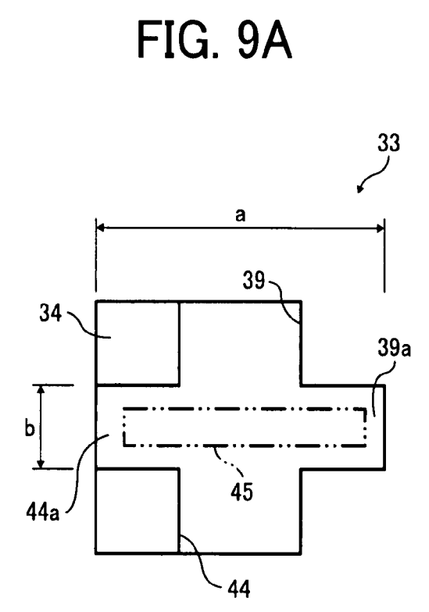
FIGS. 9A to 9C are views illustrating how to operate a jig at cutouts according to the first illustrative embodiment.
Figure 9B:
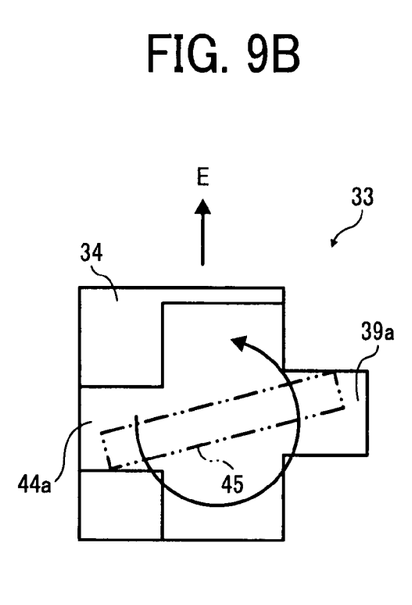
Figure 9C:
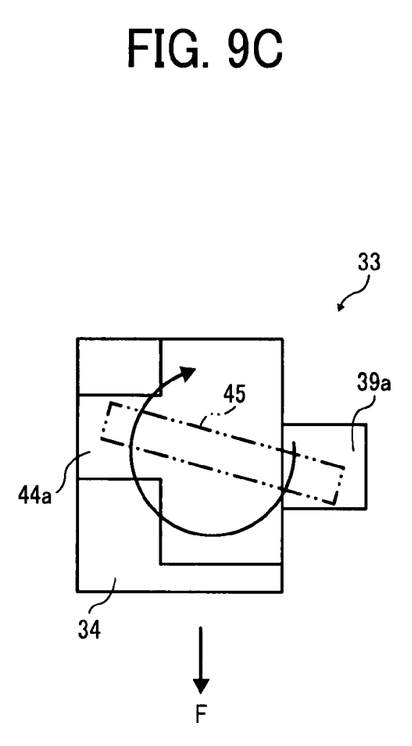

FIGS. 9A to 9C are views illustrating how to operate a jig at the cutouts 39 and 44. A length from an edge of the smaller cutout 44a to that of the smaller cutout 39a is set to a length a, such that a head of a jig 45 such as a slotted screwdriver can be inserted into the cutouts 39 and 44. Width of each of the smaller cutouts 39a and 44a is set to a width b, such that the head of the jig 45 can be rotated therewithin.

The head of the jig 45 is inserted into the cutouts 39 and 44 as indicated by a dotted line in FIG. 9A, and rotated as illustrated in FIGS. 9B and 9C so that the lens support member 33 can be moved relative to the lens unit support member 34 in a direction of the optical axis L. Specifically, a direction of movement of the lens support member 33 relative to the lens unit support member 34 can be changed by changing a direction of rotation of the head of the jig 45. For example, as illustrated in FIG. 9B, the head of the jig 45 is rotated in a counterclockwise direction so that the lens support member 33 is moved in a direction of an arrow E. By contrast, as illustrated in FIG. 9C, the head of the jig 45 is rotated in a clockwise direction so that the lens support member 33 is moved in a direction of an arrow F.

Relative positions of the lens support member 33 and the lens unit support member 34 can be adjusted as described above, thereby preventing deterioration in geometric property and modulation transfer function (MFT) of the image reading unit 16. Because adjustment of the relative positions of the lens support member 33 and the lens unit support member 34 can be achieved with a simple operation by moving the cutouts 39 using the jig 45, adjustment over a wider range can be facilitated. As a result, magnification of the imaging reading unit 16 can be easily adjusted.

Further, the smaller cutouts 39a and 44a respectively provided with the cutouts 39 and 44 make it possible to adjust the relative positions of the lens support member 33 and the lens unit support member 34 over a wider range. As a result, larger lens conjugate distances can also be adjusted, resulting in cost reduction. It should be noted that reduction in variation in lens conjugate distances generally causes an increase in an amount of glass materials and reduction of yields, thereby increasing production costs.

Figure 10:
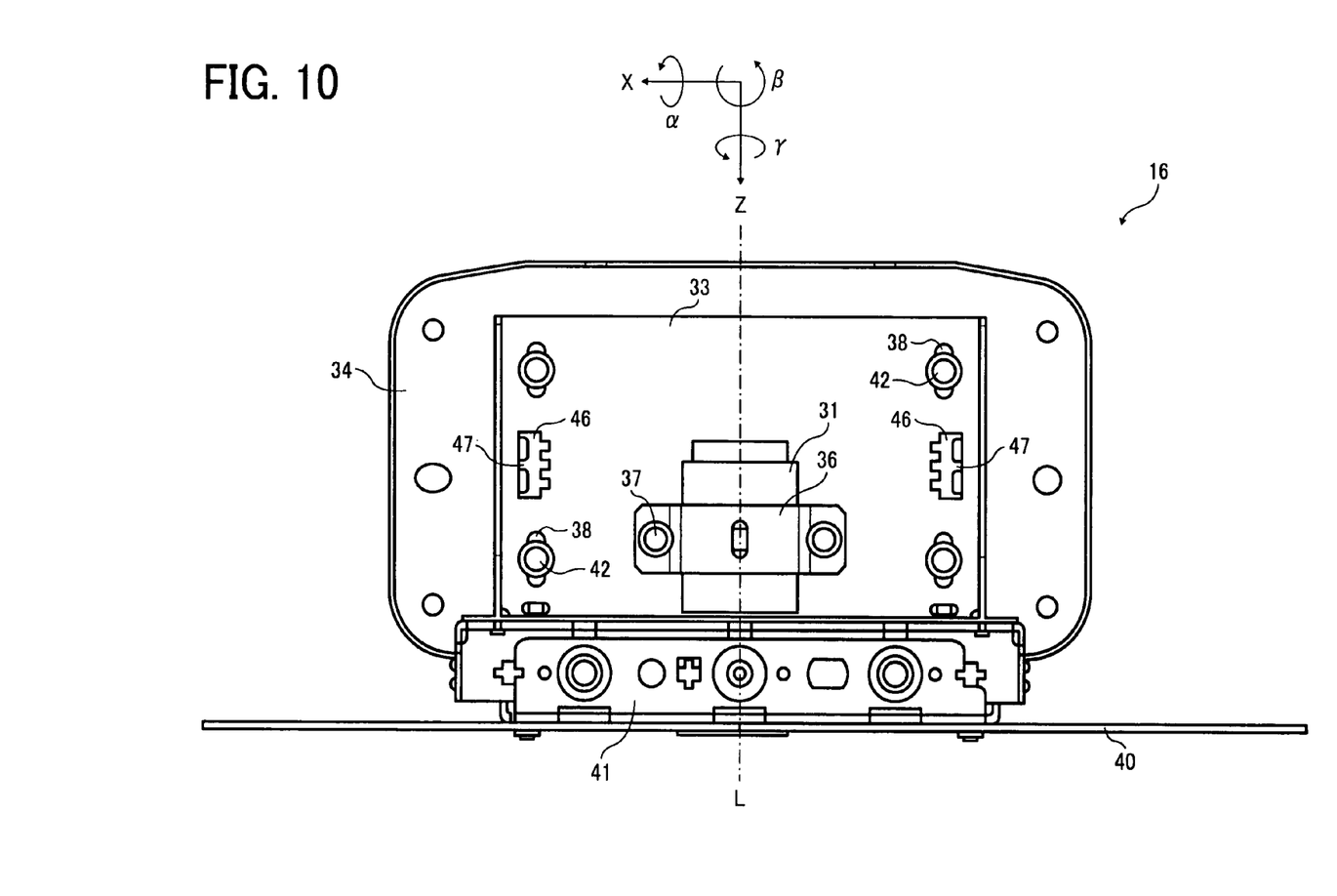
FIG. 10 is a top view illustrating the image reading unit according to a second illustrative embodiment.
Figure 11:
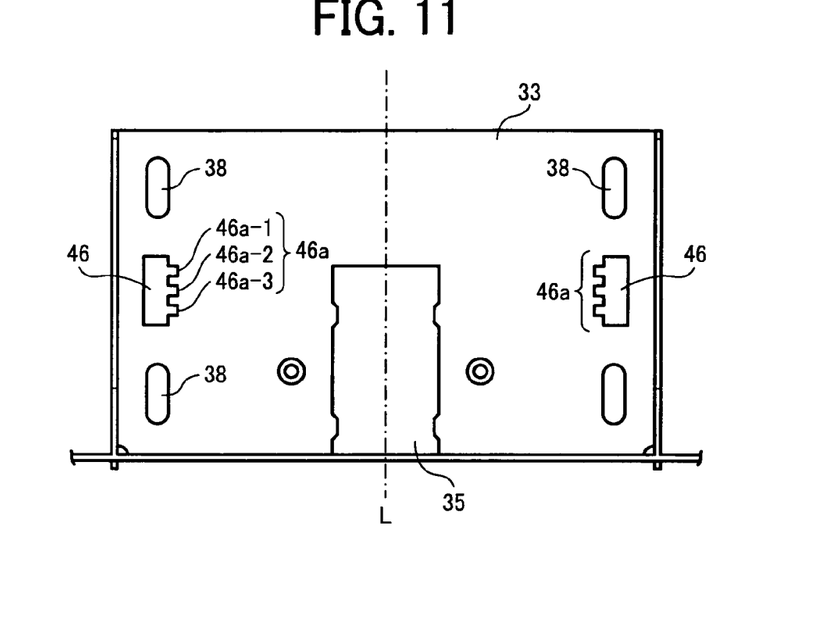
FIG. 11 is a plan view illustrating the lens support member according to the second illustrative embodiment.
Figure 12:
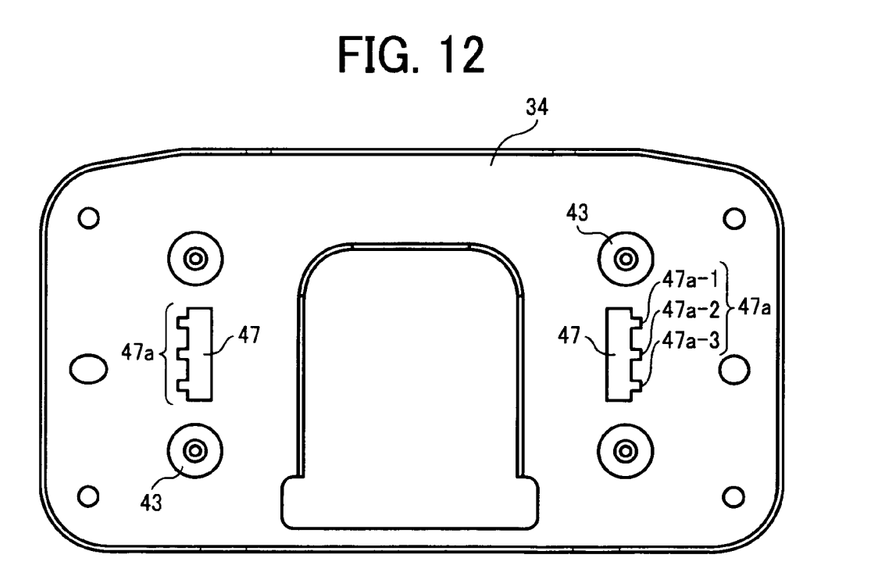
FIG. 12 is a plan view illustrating the lens unit support member according to the second illustrative embodiment.

FIG. 10 is a top view illustrating the image reading unit 16 according a second illustrative embodiment. FIG. 11 is a plan view illustrating the lens support member 33 according to the second illustrative embodiment. FIG. 12 is a plan view illustrating the lens unit support member 34 according to the second illustrative embodiment.

The difference between the first and second illustrative embodiments is the structure of the cutouts provided in the lens support member 33 and the lens unit support member 34, respectively. According to the second illustrative embodiment, the lens support member 33 and the lens unit support member 34 include cutouts 46 and cutouts 47, respectively. Each of the cutouts 46 has a smaller cutout 46a including multiple smaller cutouts 46a-1, 46a-2, and 46a-3, and each of the cutouts 47 has a smaller cutout 47a including multiple smaller cutouts 47a-1, 47a-2, and 47a-3. As is clear from the above description, each of the cutouts 46 and 47 includes three smaller cutouts. The cutouts 46 and 47 corresponding to each other have smaller cutouts 46a and 47a at different pitches, respectively.

Figure 13A:
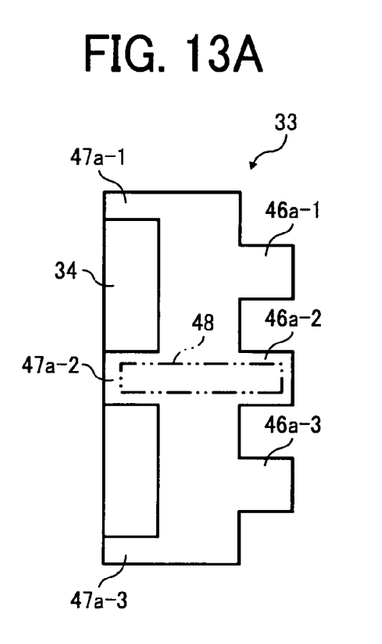
FIGS. 13A to 13D are views illustrating how to operate a jig at cutouts according to the second illustrative embodiment.
Figure 13B:
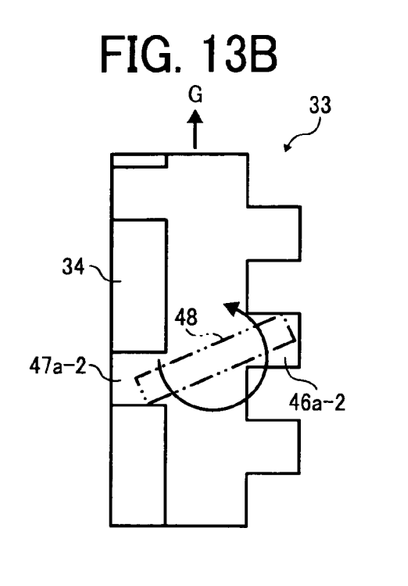
Figure 13C:
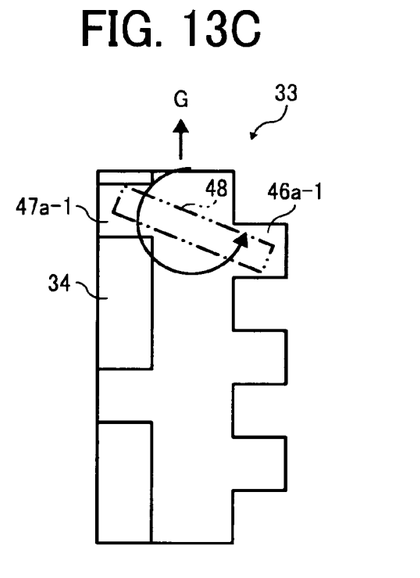
Figure 13D:
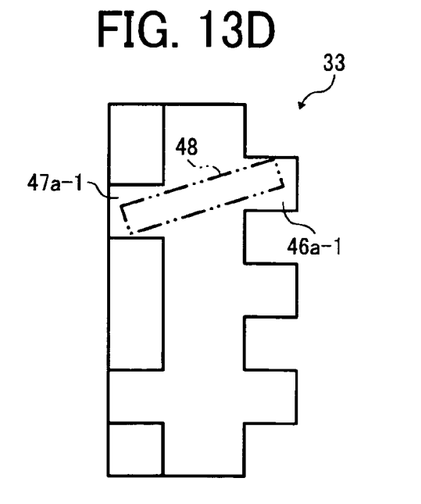

The lens support member 33 is temporarily attached to the lens unit support member 34 such that the smaller cutouts 46a-2 and 47a-2 are placed perpendicular to the optical axis L as illustrated in FIG. 13A. The lens support member 33 is moved in a direction of an arrow G when a jig 48 inserted into the smaller cutouts 46a-2 and 47a-2 is rotated in a counterclockwise direction as illustrated in FIG. 13B. When further movement of the lens support member 33 in the direction of the arrow G is required, the jig 48 is inserted into the smaller cutouts 46a-1 and 47a-1 as illustrated in FIG. 13C and rotated in the counterclockwise direction, so that the lens support member 33 is moved as illustrated in FIG. 13D.

As described above, the cutouts 46 and 47 corresponding to each other have the smaller cutouts 46a and 47a at different pitches. Accordingly, wider adjustment width can be achieved by a smaller number of small cutouts. Further, as illustrated in FIG. 13A, the smaller cutouts 46a-1 and 47a-1 are small enough that the jig 48 cannot be inserted thereinto when the lens support member 33 is temporarily attached to the lens unit support member 34. As a result, an operator can easily determine which are the appropriate smaller cutouts 46a and 47a to insert the jig 48 for moving the lens support member 33 relative to the lens unit support member 34.

Figure 14:
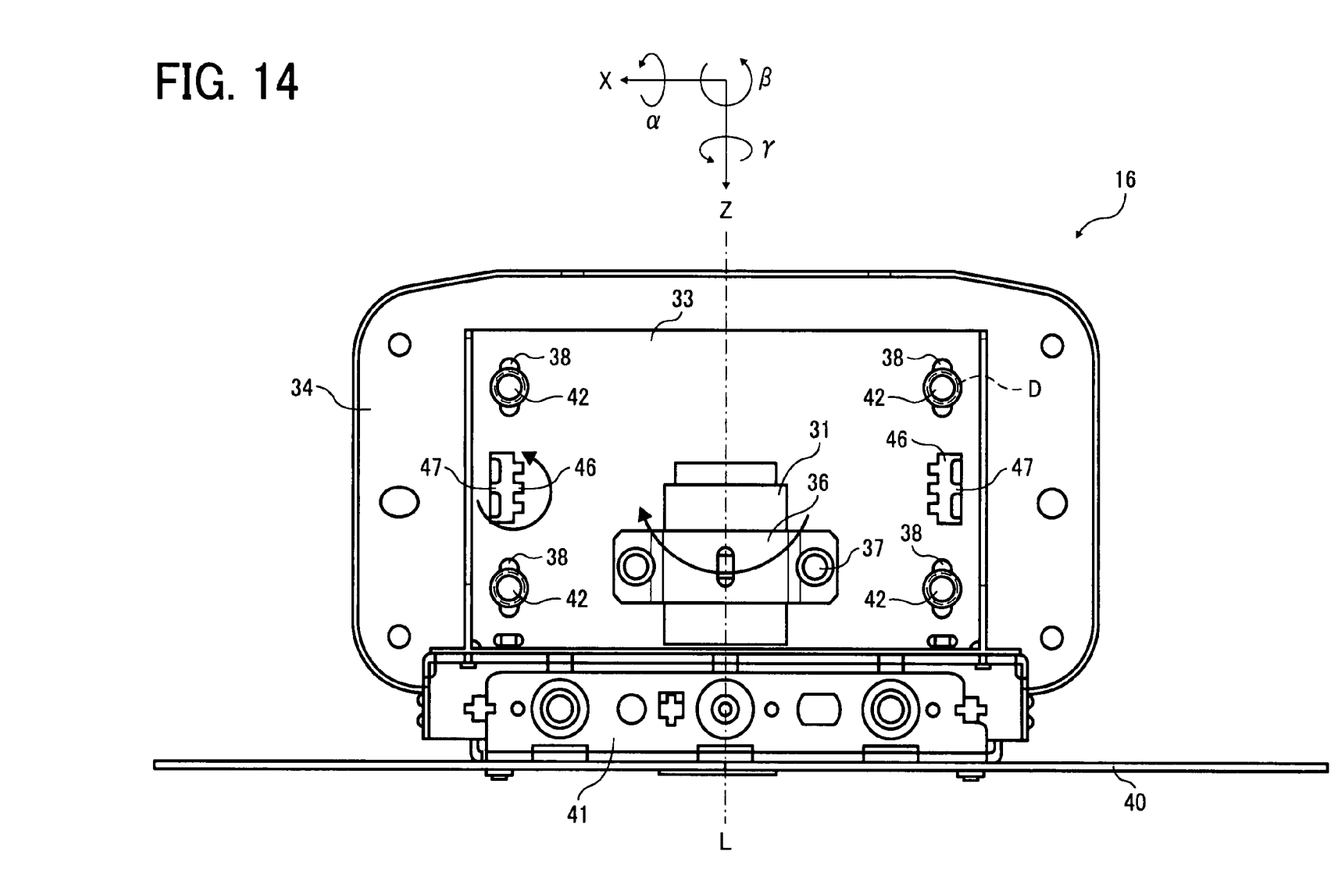
FIG. 14 is a top view illustrating movements of the cutouts and an imaging lens.

According to the foregoing illustrative embodiments, the lens support member 33 is attached to the lens unit support member 34. with the screws 42. Here, a diameter D of each of the holes 38 provided on the lens support member 33 to insert the screws 42 is not less than a diameter of each of the screws 42. For example, the diameter D of the hole 38 according to illustrative embodiments is set to 3.5 mm. Accordingly, the lens support member 33 can be rotated as illustrated in FIG. 14 when either one of the cutouts 46 (or the cutouts 39) is moved, or the cutouts 46 (or the cutouts 39) are moved in opposite directions. As a result, the imaging lens 31 can be moved in a β direction, and the lens support member 33 can be moved parallel to the optical axis L.

Figure 15A:
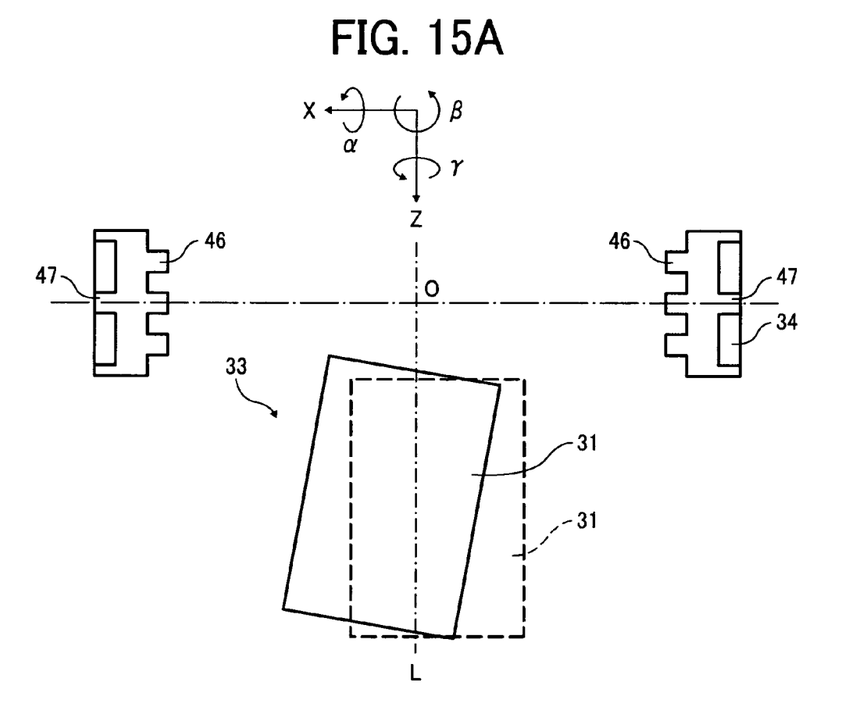
FIGS. 15A and 15B are views illustrating examples of relative positions of the cutouts and the imaging lens.
Figure 15B:
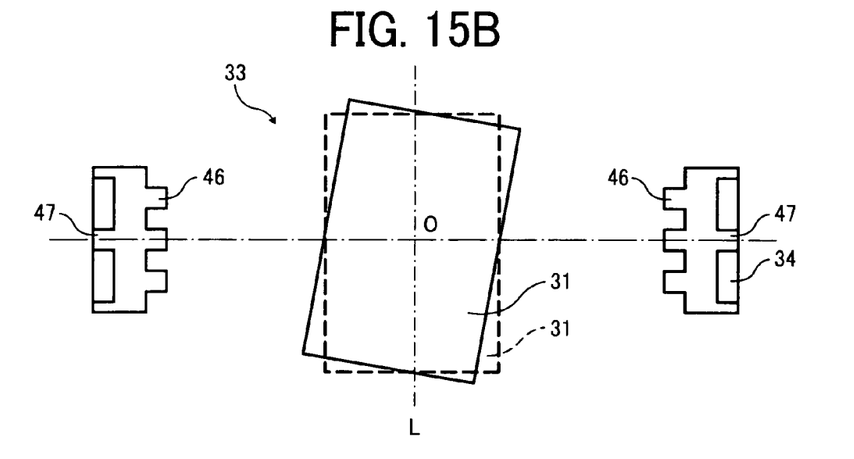

However, as illustrated in FIG. 15A, in a case in which the imaging lens 31 is moved in the β direction as described above, the imaging lens 31 is inadvertently moved in x and z directions as well around a center of rotation O relative to the optical axis L when the cutouts 46 and 47 (or the cutouts 39 and 44) are not provided on each of the left and right sides of the lens support member 33 and the lens unit support member 34, respectively, with the center of the imaging lens 31 therebetween. In FIGS. 15A and 15B, the position of the imaging lens 31 before adjustment is indicated by a solid line, and that after adjustment is indicated by a broken line.

By contrast, as illustrated in FIG. 15B, the cutouts 46 and 47 (or the cutouts 39 and 44) are provided on each of the left and right sides of the lens support member 33 and the lens unit support member 34, respectively, with the center of the imaging lens 31 therebetween so that the imaging lens 31 can be moved in the β direction without moving in the x and z directions.

Figure 16:
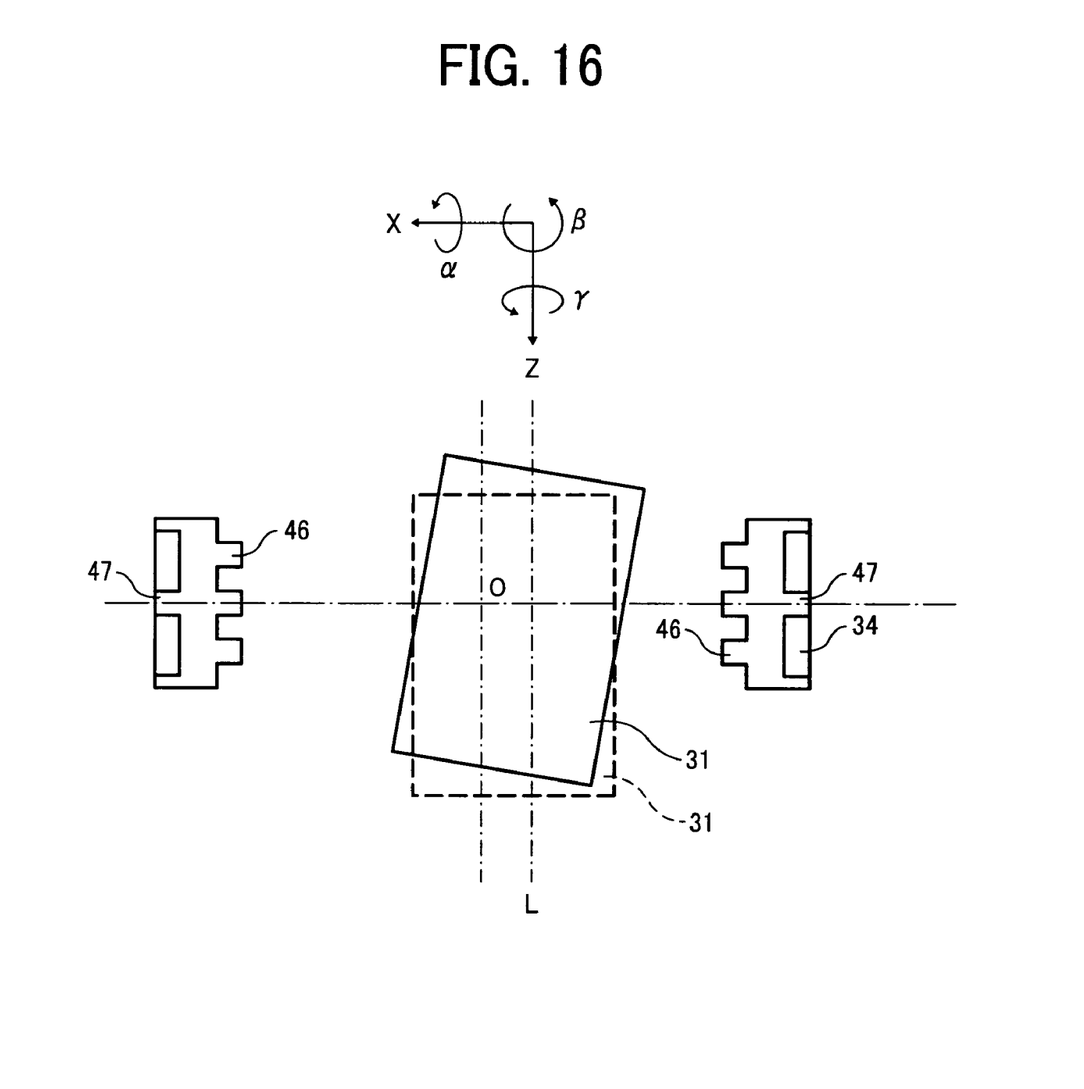
FIG. 16 is a view illustrating another example of the relative positions of the cutouts and the imaging lens.

In a case in which the cutouts 46 and 47 (or the cutouts 39 and 44) are not arranged symmetrically relative to the imaging lens 31, as indicated by a solid line in FIG. 16, the center of rotation O deviates from the optical axis L when the imaging lens 31 is moved in the β direction. Consequently, the imaging lens 31 is inadvertently moved in the x and z directions as well. By contrast, when the cutouts 46 and 47 (or the cutouts 39 and 44) are arranged symmetrically relative to the imaging lens 31 as illustrated in FIG. 15B, the imaging lens 31 can be moved in the β direction without moving in the x and z directions.

For example, the image reading unit 16 according to the foregoing illustrative embodiments is effectively employed in the scanner 4 of the image forming apparatus 1. Because the magnification can be easily adjusted in the image reading unit 16 as described above, images can be read with higher optical performance, and higher-quality images can be formed.

The foregoing illustrative embodiments are applicable to an optical system of an image forming apparatus such as a copier, facsimile machine, and a printer. Adjustment of the magnification can be easily achieved by a simple operation using a jig as described above so that the foregoing illustrative embodiments can be effectively employed in a variety of optical units.

Illustrative embodiments are not limited to the details described above, and various modifications and improvements are possible without departing from the spirit and scope of illustrative embodiments. It is therefore. to be understood that, within the scope of the associated claims, illustrative embodiments may be practiced otherwise than as specifically described herein. For example, elements and/or features of different illustrative embodiments may be combined with each other and/or substituted for each other within the scope of illustrative embodiments.

What is claimed is:

1. An optical unit, comprising:
   a lens unit, comprising:
   a lens; and
   an optical element configured to receive a light beam focused by the lens; and
   a support member configured to support the lens unit;
   wherein cutouts are provided on joint surfaces of the lens unit and the support member, respectively, such that the cutouts on the joint surface of the lens unit match the cutouts on the joint surface of the support member,
   wherein the cutouts are configured to accommodate a jig inserted thereinto and rotated to move the lens unit relative to the support member and adjust a position of the lens unit in a direction parallel to an optical axis of the lens, and
   wherein the optical unit further comprises:
   a smaller cutout contiguous with each of the cutouts provided on at least one side of each of the cutouts.

2. The optical unit according to claim 1, wherein the cutouts are aligned within a plane parallel to the optical axis of the lens.

3. The optical unit according to claim 1, wherein the plane parallel to the optical axis of the lens is displaced from the optical axis of the lens.

4. The optical unit according to claim 1, wherein a first cutout is disposed laterally symmetrically about the lens relative to a second cutout, and
   wherein a first smaller cutout contiguous with the first cutout is disposed laterally symmetrically about the lens relative to a second smaller cutout contiguous with the second cutout.

5. The optical unit according to claim 1, wherein the lens unit further comprises multiple substantially circular holes configured to accommodate fastening members to fix the lens unit to the support member, and
   wherein a diameter of each of the substantially circular holes is larger than a diameter of each of the fastening members.

6. The optical unit according to claim 1, wherein the cutouts are aligned within a plane passing through a longitudinal center of the lens in a direction perpendicular to the optical axis of the lens.

7. The optical unit according to claim 1, wherein the cutouts are disposed laterally symmetrically about the lens.

8. An image reading device, comprising the optical unit according to claim 1;
   wherein the image reading device is configured to read an image by directing the light beam onto the image, receiving the light beam reflected from the image using the optical element, and converting the reflected light into electrical signals for output as image data.

9. The optical unit according to claim 1, wherein the lens unit further comprises multiple holes configured to accommodate fastening members to fix the lens unit to the support member, and
   wherein a minimum width of each of the holes is larger than a diameter of each of the fastening members.

10. The optical unit according to claim 1, wherein the lens unit further comprises multiple substantially circular holes configured to accommodate fastening members to fix the lens unit to the support member, and
    wherein a minimum width of each of the substantially circular holes is larger than a diameter of each of the fastening members.

11. An image forming apparatus, comprising:
    the image reading device according to claim 8; and
    an image forming device configured to form a recorded image on a recording medium based on the image read by the image reading device and converted into electrical signals for output as the image data.

12. An optical unit, comprising:
a lens unit, comprising:
   a lens; and
   an optical element configured to receive a light beam focused by the lens; and
a support member configured to support the lens unit;
wherein cutouts are provided on joint surfaces of the lens unit and the support member, respectively, such that the cutouts on the joint surface of the lens unit match the cutouts on the joint surface of the support member,
wherein the cutouts are configured to accommodate a jig inserted thereinto and rotated to move the lens unit relative to the support member and adjust a position of the lens unit in a direction parallel to an optical axis of the lens, and
wherein the optical unit further comprises:
   a plurality of smaller cutouts contiguous with each of the cutouts provided on at least one side of each of the cutouts.

13. The optical unit according to claim 12, wherein the smaller cutouts are formed at different pitches on the lens unit and the support member.

14. The optical unit according to claim 12, wherein first cutouts are disposed laterally symmetrically about the lens relative to second cutouts, and wherein first smaller cutouts contiguous with the first cutouts are disposed laterally symmetrically about the lens relative to second smaller cutouts contiguous with the second cutouts.

15. The optical unit according to claim 12, wherein a first cutout is disposed laterally symmetrically about the lens relative to a second cutout, and
   wherein a first smaller cutout contiguous with the first cutout is disposed laterally symmetrically about the lens relative to a second smaller cutout contiguous with the second cutout.

16. The optical unit according to claim 12, wherein a first cutout is disposed laterally symmetrically about the lens relative to a second cutout, and
   wherein first smaller cutouts contiguous with the first cutout are disposed laterally symmetrically about the lens relative to second smaller cutouts contiguous with the second cutout.

17. The optical unit according to claim 12, wherein at least two of the smaller contiguous cutouts are formed at first pitch on the lens unit, and
   wherein at least two of the smaller contiguous cutouts are formed at a second pitch on the support member.

18. The optical unit according to claim 17, wherein the first pitch is smaller than the second pitch.

19. The optical unit according to claim 17, wherein the first pitch is different from the second pitch.

* * * * *